United States Patent
Woodard et al.

(10) Patent No.: US 12,195,364 B2
(45) Date of Patent: *Jan. 14, 2025

(54) SYSTEM AND METHOD FOR REMOVING LONG-CHAIN AND SHORT-CHAIN PER- AND POLYFLUOROALKYL SUBSTANCES (PFAS) FROM CONTAMINATED WATER

(71) Applicant: Emerging Compounds Treatment Technologies, Inc., Irvine, CA (US)

(72) Inventors: Steven E. Woodard, Cumberland, ME (US); John C. Berry, Mooresville, NC (US); Michael G. Nickelsen, Fuquay-Varina, NC (US)

(73) Assignee: Emerging Compounds Treatment Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,870

(22) Filed: Feb. 8, 2022

(65) Prior Publication Data
US 2022/0250948 A1    Aug. 11, 2022

Related U.S. Application Data

(60) Provisional application No. 63/147,924, filed on Feb. 10, 2021.

(51) Int. Cl.
| | |
|---|---|
| *C02F 1/42* | (2023.01) |
| *B01J 41/05* | (2017.01) |
| *B01J 49/07* | (2017.01) |
| *C02F 101/36* | (2006.01) |

(52) U.S. Cl.
CPC ............... *C02F 1/42* (2013.01); *B01J 41/05* (2017.01); *B01J 49/07* (2017.01);
(Continued)

(58) Field of Classification Search
CPC .... C02F 1/42; C02F 2101/36; C02F 2101/40; C02F 2101/301; C02F 2103/00;
(Continued)

(56) References Cited

U.S. PATENT DOCUMENTS 4,383,920 A * 5/1983 Muller .................. C02F 9/00
                                                          210/93
4,659,460 A * 4/1987 Muller .................. B01D 15/00
                                                          210/93
(Continued)

FOREIGN PATENT DOCUMENTS

EP    497632 A1 * 8/1992 ............ B01J 47/026
EP    1431248 A2 * 6/2004 ............ B01J 41/05
(Continued)

OTHER PUBLICATIONS

Woodard S, Berry J, Newman B. Ion exchange resin for PFAS removal and pilot test comparison to GAC. Remediation. 2017;27:19-27. https://doi.org/10.1002/rem.21515. (9 pages). (Year: 2017).*
(Continued)

*Primary Examiner* — Jonathan M Peo
(74) *Attorney, Agent, or Firm* — Iandiorio Teska & Coleman, LLP

(57) ABSTRACT

A system for removing long-chain and short-chain per- and polyfluoroalkyl substances (PFAS) from contaminated water using a regenerable anion exchange resin includes at least one first anion exchange resin vessel configured to receive a flow of water contaminated with long and short-chain PFAS compounds. A first anion exchange resin vessel includes a first regenerable anion exchange resin therein configured such that a majority of the long-chain PFAS compounds are removed by the first regenerable anion exchange resin. A second anion exchange resin vessel receives the flow of water having a majority of the long-chain PFAS compounds removed and includes a second regenerable anion exchange
(Continued)

resin and is configured to remove a majority of the short-chain PFAS compounds from the contaminated water and produce a treated flow of water having a majority of the long and short-chain PFAS compounds removed.

13 Claims, 10 Drawing Sheets

(52) U.S. Cl.
CPC .... *C02F 2001/422* (2013.01); *C02F 2101/36* (2013.01); *C02F 2301/08* (2013.01); *C02F 2303/16* (2013.01)

(58) Field of Classification Search
CPC .......... C02F 2001/422; C02F 2001/427; C02F 2001/425; C02F 2301/08; C02F 2303/16; C02F 2303/18; B01J 49/07; B01J 49/08; B01J 49/57; B01J 49/60; B01J 49/14; B01J 41/05; B01J 47/026

See application file for complete search history.

(56) References Cited

U.S. PATENT DOCUMENTS

| | | | | |
|---|---|---|---|---|
| 6,960,302 | B2 * | 11/2005 | Miers, Jr. | ............... B01J 47/022 210/664 |
| 2004/0188337 | A1 * | 9/2004 | Miers, Jr. | ............... B01J 47/028 210/669 |
| 2017/0297926 | A1 | 10/2017 | Nickelsen et al. | |
| 2018/0193791 | A1 * | 7/2018 | Woodard | ............... B01D 53/02 |
| 2019/0263684 | A1 * | 8/2019 | Nickelsen | ................ B01J 49/57 |

FOREIGN PATENT DOCUMENTS

| | | | | |
|---|---|---|---|---|
| WO | WO-2012158936 | A1 * | 11/2012 | ............. B01D 15/00 |
| WO | WO-2018097875 | A1 * | 5/2018 | ............. C02F 1/283 |
| WO | WO-2020112427 | A1 * | 6/2020 | ............ B01J 47/022 |
| WO | 2020247029 | A1 | 12/2020 | |

OTHER PUBLICATIONS

Dudley, Master's Thesis: Removal of Perfluorinated Compounds by Powdered Activated Carbon, Superfine Powdered Activated Carbon, and Anion Exchange Resins, North Carolina State University (2012). (167 pages). (Year: 2012).*

Appleman et al., Treatment of Poly- and Perfluoroalkyl Substances in U.S. Full-Scale Treatment Systems, Water Research 51, (2014), p. 246-255.

Written Opinion from the International Searching Authority for International Application No. PCT/US2022/015894, dated May 4, 2022, five (5) pages.

* cited by examiner

SYSTEM AND METHOD FOR REMOVING LONG-CHAIN AND SHORT-CHAIN PER- AND POLYFLUOROALKYL SUBSTANCES (PFAS) FROM CONTAMINATED WATER

RELATED APPLICATIONS

This application claims benefit of and priority to U.S. Provisional Application Ser. No. 63/147,924 filed Feb. 10, 2021, under 35 U.S.C. §§ 119, 120, 363, 365, and 37 C.F.R. § 1.55 and § 1.78, which is incorporated herein by this reference.

FIELD OF THE INVENTION

This invention relates to a system and method for removing long-chain and short-chain per- and polyfluoroalkyl substances (PFAS) from contaminated water.

BACKGROUND OF THE INVENTION

PFAS are a class of man-made compounds that have been used to manufacture consumer products and industrial chemicals, including, inter alia, aqueous film forming foams (AFFFs). AFFFs have been the product of choice for firefighting at military and municipal fire training sites around the world. AFFFs have also been used extensively at oil and gas refineries for both fire training and firefighting exercises. AFFFs work by blanketing spilled oil/fuel, cooling the surface, and preventing re-ignition. PFAS in AFFFs have contaminated the groundwater at many of these sites and refineries, including more than 100 U.S. Air Force sites.

PFAS may be used as surface treatment/coatings in consumer products such as carpets, upholstery, stain resistant apparel, cookware, paper, packaging, and the like, and may also be found in chemicals used for chemical plating, electrolytes, lubricants, and the like, which may eventually end up in the water supply.

PFAS are bio-accumulative in wildlife and humans because they typically remain in the body for extended periods of time. Laboratory PFAS exposure studies on animals have shown problems with growth and development, reproduction, and liver damage. In 2016, the U.S. Environmental Protection Agency (EPA) issued the following health advisory levels (HALs) for perfluorooctanesulfonic acid (PFOS) and perfluorooctanoic acid (PFOA): 0.07 µg/L for both the individual constituents and the sum of PFOS and PFOA concentrations, respectively. Additionally, PFAS are highly water soluble in water, result in large, dilute plumes, and have a low volatility.

PFAS are very difficult to treat largely because they are extremely stable compounds which include carbon-fluorine bonds. Carbon-fluorine bonds are the strongest known bonds in nature and are highly resistant to breakdown.

The vast majority of available conventional water treatment systems and methods to remove PFAS from water have proven to be ineffective. See e.g., Rahman, et al., *Behaviour and Fate of Perfluoroalkyl and Polyfluoroalkyl Substances (PFASs) in Drinking Water Treatment*, Water Research 50, pp. 318-340 (2014), incorporated by reference herein. Conventional activated carbon adsorption system and methods to remove PFAS from water have shown to be somewhat effective on the longer-chain PFAS, but have difficulty in removing branched and shorter chain compounds, see e.g. Dudley, Master's Thesis: *Removal of Perfluorinated Compounds by Powdered Activated Carbon, Superfine Powdered Activated Carbon, and Anion Exchange Resins*, North Carolina State University (2012), incorporated by reference herein.

Appleman et al., *Treatment of Poly- and Perfluoroalkyl Substances in U.S. Full-Scale Treatment Systems*, Water Research 51, pp. 246-255 (2014), incorporated by reference herein, reported that, similar to activated carbon, some conventional anion exchange resins may be more effective at treating longer chain PFAS than the shorter chain compounds. Other conventional anion exchange resins have shown some success in removing a broader range of PFAS, including the shorter-chain compounds, see e.g., Dudley, cited supra.

Conventional anion exchange treatment systems and methods typically utilize anion exchange resin where positively charged anion exchange resin beads are disposed in a lead vessel which receives a flow of water contaminated with anionic contaminants, such as PFAS. The negatively charged contaminants are trapped by the positively charged resin beads and clean water flows out of the lead anion exchange vessel into a lag vessel, also containing anion exchange resin beads. A sample tap is frequently used to determine when the majority of the anion exchange beads in the lead exchange vessel have become saturated with contaminants. When saturation of the resin anion exchange beads is approached, a level of contaminants will be detected in the effluent tap. When this happens, the lead vessel is taken off-line and the contaminated water continues flowing to the lag vessel which now becomes the lead vessel. The lead-lag vessel configuration ensures that a high level of treatment is maintained at all times.

As discussed above, some conventional anion exchange resins can also be used to remove PFAS from water. A number of known methods exist to regenerant the anion exchange beads in the anion exchange vessel. Some known methods rely on flushing the resin with a brine or caustic solution. Other known methods may include the addition of solvents, such as methanol or ethanol, to enhance the removal of the PFAS trapped on the anion exchange beads. Effective resin regeneration has been demonstrated by passing a solvent (e.g., methanol or ethanol), blended with a sodium chloride or sodium hydroxide solution, through the resin. See e.g., Deng et al., *Removal of Perfluorooctane Sulfonate from Wastewater by Anion Exchange Resins: Effects of Resin Properties and Solution Chemistry*, Water Research 44, pp. 5188-5195 (2010) and Chularueangaksorn et al., *Regeneration and Reusability of Anion Exchange Resin Used in Perfluorooctane Sulfonate Removal by Batch Experiments*, Journal of Applied Polymer Science, 10.1002, pp. 884-890 (2013), both incorporated by reference herein. However, such methods may generate a large amount of toxic regenerant solution which must be disposed of at significant expense.

Du et al., *Adsorption Behavior and Mechanism of Perfluorinated Compounds on Various Adsorbents—A Review*, J. Haz. Mat. 274, pp. 443-454 (2014), incorporated by reference herein, discloses a need to further treat the waste regenerant solution to concentrate the PFAS and reduce the volume of waste. This is a key step because resin regeneration produces a significant volume of toxic waste.

The known methods for removing PFAS from water discussed above typically do not optimize the anion exchange resin and may have limited capacity for removing PFAS mass. Such known methods may also incompletely regenerant the anion exchange resin by attempting to desorb the PFAS from the resin. Such known methods may incompletely regenerant the anion exchange resin which may lead to a loss of capacity, otherwise known as active sites, during each successive loading and regeneration cycle. This cumulative buildup of PFAS on the ion exchange resin is often referenced to as a "heel," and results in reduced treatment effectiveness as the heel builds up over time. Such known methods may also not reclaim and reuse the spent regenerant solution which may increase the amount spent regenerant solution with removed PFAS therein. This increases the amount of toxic spent regenerant solution with PFAS, which must be disposed of at significant expense.

Conventional systems and methods for attempting to remove PFAS from water also include biological treatment, air stripping, reverse osmosis, and advanced oxidation. All of these conventional techniques are ineffective and/or extremely expensive.

Some manufacturing facilities produce contaminated wastewater and/or contaminated cooling water containing long and short-chain PFAS compounds. Long-chain PFAS compounds typically are designated having six or more carbons for perfluoroalkyl sulfonic acids and having seven or more carbons for perfluoroalkyl carboxylic acids. Short-chain PFAS compounds typically have less than six carbons for perfluoroalkyl sulfonic acids and less than seven carbons for perfluoroalkyl carboxylic acids.

Removal of PFAS compounds from contaminated water may be accomplished using anion exchange resin and/or granular activated carbon (GAC) discussed above. One advantage of using anion exchange resins is the anion exchange resin can be regenerated on site which may substantially reduce cost of operation.

In general, anion exchange resins have a higher affinity for long-chain PFAS compounds. Therefore, short-chain PFAS compounds tend to break through anion exchange resins faster than long-chain PFAS compounds. Significant measures may be employed to minimize the breakthrough of short-chain PFAS compounds. Premature breakthrough of short-chain PFAS compounds may result in more frequent regeneration of the anion exchange resins or costly replacement of the anion exchange resins. To date, there are no known systems or methods which can effectively and efficiently remove both short and long-chain PFAS compounds from contaminated water using regenerable resin.

BRIEF SUMMARY OF THE INVENTION

In one aspect, a system for removing long-chain and short-chain per- and polyfluoroalkyl substances (PFAS) from contaminated water using a regenerable anion exchange resin is featured. The system includes at least one first anion exchange resin vessel configured to receive a flow of water contaminated with long and short-chain PFAS compounds. The at least one first anion exchange resin vessel includes a first regenerable anion exchange resin therein having a high affinity for long-chain PFAS compounds configured such that a majority of the long-chain PFAS compounds sorb to the first regenerable anion exchange resin to remove a majority of the long-chain PFAS compounds from the contaminated water and produce a flow of water having a majority of the long-chain PFAS compounds removed. The system also includes at least one second anion exchange resin vessel configured to receive the flow of water having a majority of the long-chain PFAS compounds removed. The at least one second anion exchange resin vessel includes a second regenerable anion exchange resin therein having a high affinity for short-chain PFAS compounds and configured such that a majority of the short-chain PFAS compounds sorb to the second anion exchange resin to remove a majority of the short-chain PFAS compounds from the contaminated water and produce a treated flow of water having a majority of the long and short-chain PFAS compounds removed.

In one embodiment, a resin regeneration subsystem may be configured to introduce a flow of a regenerant solution into the at least one second regenerable anion exchange resin vessel to regenerant the second regenerable anion exchange resin and produce a flow of a first spent regenerant solution. The resin regeneration subsystem may include introducing the flow of the first spent regenerant solution or another flow of regenerant solution into the at least one first regenerable anion exchange vessels to regenerate the first regenerable anion exchange resin and produce a flow of a second spent regenerant solution. The first regenerable anion exchange resin and the second regenerable anion exchange resin may include a macroporous, strong base, anion exchange resin. The second anion exchange resin may include a macroporous resin including functional groups configured to increase the affinity of the short-chain PFAS compounds to the second anion exchange resin and increase the capacity of the second anion exchange resin to remove the short-chain PFAS compounds from the flow of water having a majority of the long-chain PFAS compounds already removed. The length and basicity of the functional groups may be selected to increase the affinity of the short-chain PFAS compounds to the second anion exchange resin. The at least one first anion exchange vessel may include at least one lead vessel and at least one lag vessel. The at least one second anion exchange vessel may include at least one lead vessel and at least one lag vessel.

In another aspect, a system for removing long-chain and short-chain per- and polyfluoroalkyl substances (PFAS) from contaminated water using a regenerable anion exchange resin is featured. The system includes at least one anion exchange resin vessel configured to receive a flow of water contaminated with long and short-chain PFAS compounds. The at least one anion exchange resin vessel includes a first regenerable anion exchange resin therein having a high affinity for long-chain PFAS compounds configured such that a majority of the long-chain PFAS compounds sorb to the first regenerable anion exchange resin to remove a majority of the long-chain PFAS compounds from the contaminated water and produce a flow of water having a majority of the long-chain PFAS compounds removed. The at least one anion exchange resin vessel further includes a second regenerable anion exchange resin therein configured to receive the flow of water having a majority of the long-chain PFAS compounds removed. The second regenerable anion exchange resin has a high affinity for short-chain PFAS compounds and is configured such that a majority of the short-chain PFAS compounds sorb to the second anion exchange resin to remove a majority of the short-chain PFAS compounds from the contaminated water and produce a treated flow of water having a majority of the long and short-chain PFAS compounds removed.

In one embodiment, the at least one first anion exchange vessel may include at least one lead vessel train and at least one lag vessel train. The system may include a resin regeneration subsystem configured to introduce a flow of a regenerant solution into the second regenerable anion exchange resin to regenerate the second regenerable anion exchange resin and produce a flow of a first spent regenerant solution. The resin regeneration subsystem may include introducing the flow of the first spent regenerant solution or another flow of regenerant solution into first regenerable anion exchange resin to regenerate the first regenerable anion exchange resin and produce a flow of a second spent regenerant solution. The first regenerable anion exchange resin and the second regenerable anion exchange resin may include a macroporous, strong base, anion exchange resin. The second anion exchange resin may include a macroporous resin including functional groups configured to increase the affinity of the short-chain PFAS compounds to the second anion exchange resin and increase the capacity of the second anion exchange resin to remove the short-chain PFAS compounds from the flow of water having a majority of the long-chain PFAS compounds already removed. The length and basicity of the functional groups may be selected to increase the affinity of the short-chain PFAS compounds to the second anion exchange resin. The at least one lead vessel train may include one or more anion exchange vessels connected in series such that at least one anion exchange vessel may be configured to receive the flow of contaminated water and includes the first regenerable anion exchange resin therein to remove a majority of the long-chain PFAS compounds from the contaminated water and produce a flow of water having a majority of the long-chain PFAS compounds removed and at least one anion exchange vessel may be configured to receive the flow of water having a majority of the long-chain PFAS compounds removed and may include the second regenerable anion exchange resin therein to remove a majority of the short-chain PFAS compounds and produce a treated flow of water having a majority of the long and short-chain PFAS compounds removed. The at least one lag vessel train may include one or more anion exchange vessels connected in series configured to receive the treated flow of water which may have carryover short-chain PFAS compounds therein and output a treated flow of water having a majority of the long and short-chain PFAS compounds removed.

In another aspect, a method for removing long-chain and short-chain per- and polyfluoroalkyl substances (PFAS) from contaminated water using a regenerable anion exchange resin is featured, the method includes receiving a flow of water contaminated with long and short-chain PFAS compounds, sorbing a majority of the long-chain PFAS compounds to a first regenerable anion exchange resin having a high affinity for long-chain PFAS compounds to remove a majority of the long-chain PFAS compounds from the flow of contaminated water and produce a flow of water having a majority of the long-chain PFAS compounds removed, and receiving the flow of water having a majority of the long-chain PFAS compounds removed and sorbing a majority of the short-chain PFAS compounds to a second anion exchange resin having a high affinity for short-chain PFAS compound to remove a majority of the short-chain PFAS compounds from the contaminated water and produce a treated flow of water having a majority of the long and short-chain PFAS compounds removed.

In one embodiment, the method may include a resin regeneration process which may be configured to introduce a flow of a regenerant solution into the second regenerable anion exchange resin to regenerant the second regenerable anion exchange resin and produce a flow of a first spent regenerant solution. The method may include introducing the flow of the first spent regenerant solution or another flow of regenerant solution into the first regenerable anion exchange resin to regenerate the first regenerable anion exchange resin and produce a flow of a second spent regenerant solution. The first regenerable anion exchange resin and the second regenerable anion exchange resin may include a macroporous, strong base, anion exchange resin. The second anion exchange resin may include a macroporous resin including functional groups configured to increase the affinity of the short-chain PFAS compounds to the second anion exchange resin and increase the capacity of the second anion exchange resin to remove the short-chain PFAS compounds from the flow of water having a majority of the long-chain PFAS compounds already removed. The length and basicity of the functional groups may be selected to increase the affinity of the short-chain PFAS compounds to the second anion exchange resin.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
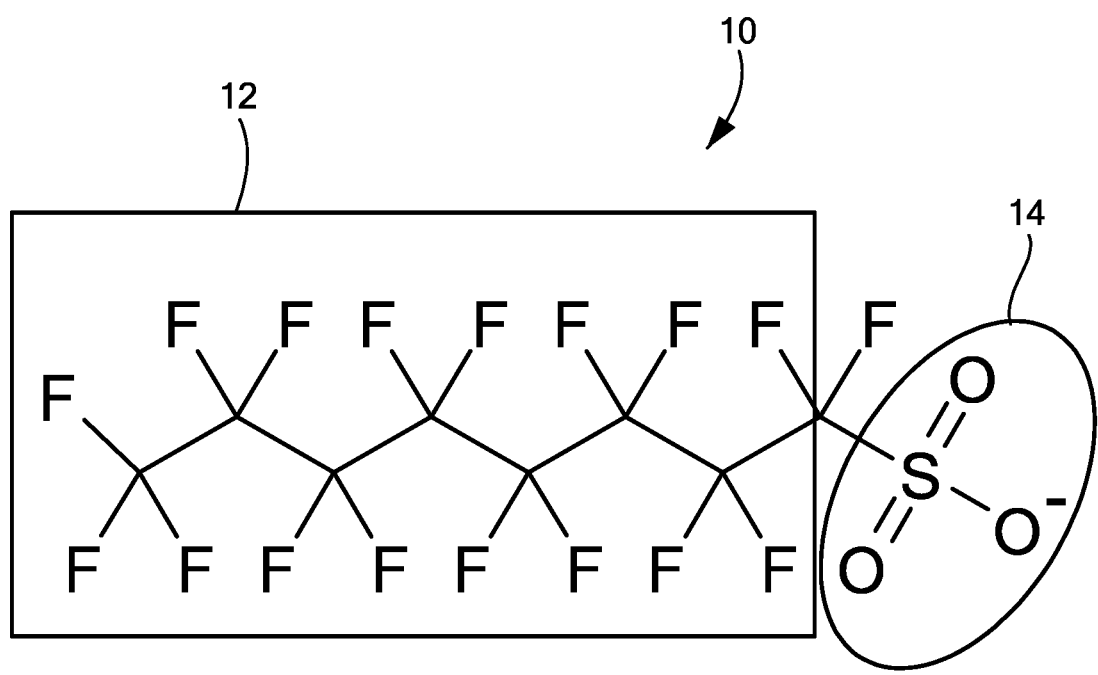
FIG. 1 shows an example of a typical PFAS with a hydrophobic non-ionic tail and an anionic head.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section, anion exchange resins are highly effective at removing PFAS from water because of the multiple removal methods involved. The molecular structure of most PFAS compounds can be broken into two functional units including the hydrophobic non-ionic "tail," comprised of the fluorinated carbon chain and the hydrophilic anionic "head," having a negative charge. FIG. 1 shows an example of a typical PFAS 10 with hydrophobic non-ionic tail 12 and hydrophilic anionic head 14, in this example, a sulfonate group, although anionic head 14 may be a carboxylate group or similar type group.

Figure 2:
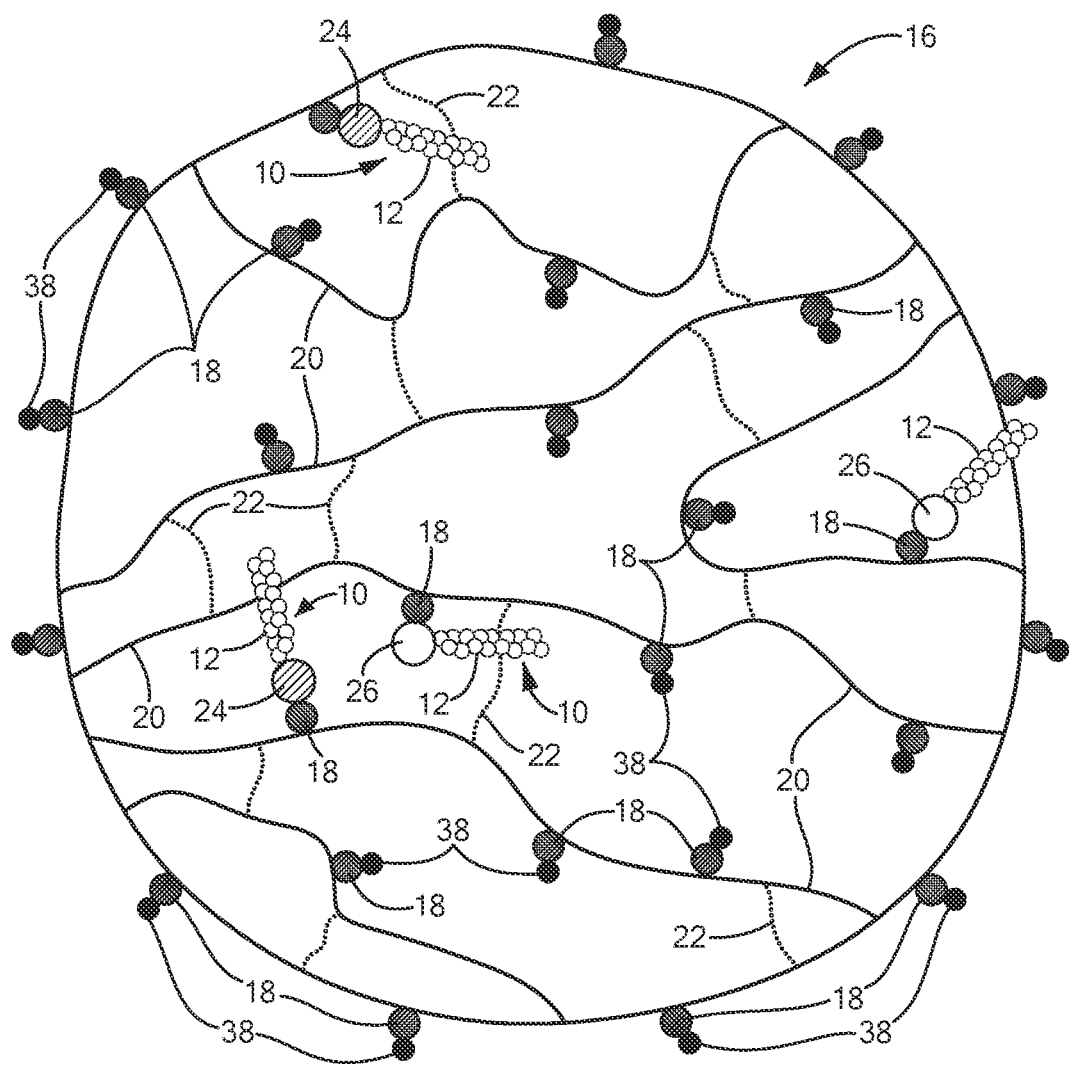
FIG. 2 shows a three-dimensional view depicting the complex three-dimensional structure of a typical anion exchange resin bead showing examples of positively charged anion exchange sites on the resin bead binding to negatively charged hydrophilic heads of PFAS molecules and the hydrophobic carbon-fluorine tails of the PFAS sorbing to the hydrophobic backbone of the anion exchange resin bead.

Anion exchange resins are essentially adsorbents with anion exchange functionality. The resin beads are typically composed of neutral copolymers (plastics) that have positively charged exchange sites. FIG. 2 shows an example of the complex three-dimensional structure of a typical anion exchange resin bead 16 with positively charged exchange sites exemplarily indicated at 18. Anion exchange resins tend to be effective at removing PFAS from water because they take advantage of the unique properties of both the anion exchange resin bead and the perfluorinated contaminants, or PFAS, using a dual mechanism of adsorption and anion exchange. For example, hydrophobic carbon-fluorine tail 12, FIGS. 1 and 2 of PFAS 10, adsorbs to the hydrophobic backbone on anion exchange resin 16, FIG. 2, comprised of cross-linked polystyrene polymer chains, exemplarily indicated at 20 and divinylbenzene cross-links exemplarily indicated at 22. The negatively-charged hydrophilic heads 24 (sulfonate groups) or 26 (carboxylate groups) of PFAS 10 are attracted to positively-charged anion exchange sites 18 on anion exchange resin bead 16. The negatively charged heads 24, 26 of PFAS 10 displaces exchangeable inorganic counter ion 38, e.g., a chloride ion which is provided on anion exchange bead 16 when it is manufactured. The hydrophobic, uncharged carbon-fluorine tails 12 are adsorbed to the uncharged hydrophobic backbone comprised of polystyrene polymer chain 20 and divinylbenzene crosslink 22 via Van der Waals forces as shown.

Depending on the specific properties of both resin bead 16 and the PFAS 10, this dual mechanism of removal may be highly effective at removing PFAS from water and certain anion exchange resins have very high removal capacity for PFAS from water.

While the dual mechanism of PFAS removal discussed above may be highly effective at removing PFAS from water because the adsorption of the hydrophobic tails of the PFAS to the hydrophobic backbone of the anion resin exchange bead, it also makes resin regeneration and reuse more difficult. A high concentration of a brine or base solution, e.g., a solution of a salt, such as NaCl, and water, or a solution of a base, such as NaOH and water, may be used to effectively displace the anionic head of the PFAS from the anion exchange site of the anion exchange resin bead, but the hydrophobic carbon-fluorine tail tends to stay adsorbed to the resin backbone. Similarly, an organic solvent, e.g., methanol or ethanol, may be used to effectively desorb the hydrophobic tail from the backbone, but then the anionic head of the PFAS stays attached to the resin anion exchange site. Research to date has demonstrated that effective regeneration techniques must overcome both mechanisms of attraction. Solutions combining organic solvents and a salt or base, such as NaCl or NaOH, have shown the most successful results to date, e.g., as disclosed in Deng et al., 2010, and Chularueangaksorn et al., 2013, discussed in the Background section. Other research has focused on using combinations of ammonium salts, including ammonium hydroxide and ammonium chloride, e.g., as disclosed by Conte et al., *Polyfluorinated Organic Micropollutants Removal from Water by Ion Exchange and Adsorption*, Chemical Engineering Transactions, Vol. 43 (2015), incorporated by reference herein.

Figure 3:
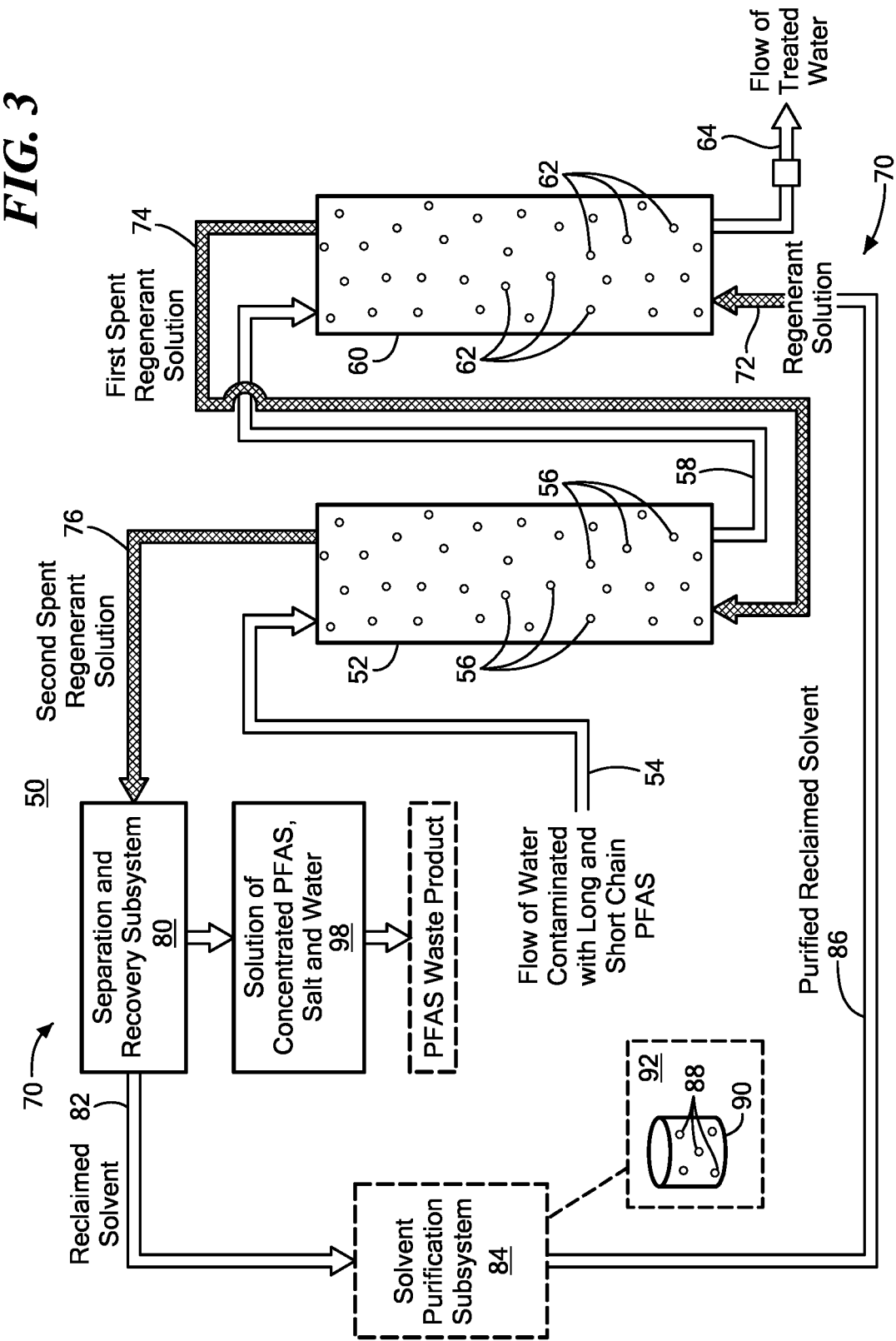
FIG. 3 is a schematic block diagram showing the primary components of one example of system for removing long-chain and short-chain PFAS from contaminated water.

There is shown in FIG. 3 one example of system 50 for removing long and short-chain PFAS from contaminated water using a regenerable anion exchange resin. System 50 includes at least first one anion exchange vessel, e.g., anion exchange vessel 52, which receives flow 54 of water contaminated with long and short-chain PFAS compounds. Anion exchange resin vessel 52 includes first regenerable anion exchange resin therein, exemplarily indicated at 56, having a high affinity for long-chain PFAS compounds. First regenerable anion exchange resin 56 is configured such that a majority of long-chain PFAS compounds in flow 54 sorb to regenerable anion exchange resin 56 to remove a majority of the long-chain PFAS compounds from flow 54 of contaminated water 54 to produce flow 58 having a majority of the long-chain PFAS compounds removed.

System 50 also includes at least one second anion exchange resin vessel, e.g., second anion exchange vessel 60 which receives flow 58 of water having a majority of long-chain PFAS removed. Second anion exchange resin vessel 60 includes second regenerable anion exchange resin therein, exemplarily indicated at 62, having a high affinity for short-chain PFAS compounds and is configured such that a majority of the short-chain PFAS compounds in flow 58 sorb to second anion exchange resin 62 to remove a majority of the short-chain PFAS compounds from flow 58 and produce treated flow 64 of water having a majority of long and short-chain PFAS compounds removed.

The result is both long and short-chain PFAS compounds are effectively and efficiently removed from flow 54 of water contaminated with long and short-chain PFAS compounds. As discussed below, first regenerable anion exchange resin 56 and second regenerable anion exchange resin 62 are highly regenerable which preferably reduces the frequency of regeneration of anion exchange resin and therefore reduces costs.

In one example, second regenerable anion exchange resin 62 preferably includes a macroporous resin including functional groups configured to increase the affinity of short-chain PFAS compounds to second anion exchange resin 62 and increase the capacity of second anion exchange resin 62 to remove short-chain PFAS compounds from flow 58 of water having the majority of the long-chain PFAS compounds already removed.

In one design, the length and basicity of the functional groups of second anion exchange resin 62 are preferably selected to increase the affinity of short-chain PFAS compounds to second anion exchange resin 62. As known by those skilled in the art, increasing the length of the functional group of an anion exchange resin provides more surface area for sorption of PFAS compounds (both long-chain and short-chain). Shorter chain PFAS compounds have less surface area than long-chain PFAS compound and are therefore more difficult to remove from contaminated water but are easier to remove from the resin during regeneration. When the length of the anion exchange resin functional groups is increased this renders the resin more effective at removing short-chain compounds. However, increasing the length of the functional group makes it more difficult to regenerate the resin.

Additionally, increasing the length of the functional group of an anion exchange resin causes the nitrogen (i.e., the amine group) on the functional group to have a stronger positive charge because it increases the basicity and thus increases its ability to attract short-chain PFAS molecules.

When the length of the anion exchange resin functional groups is decreased this renders the resin easier to regenerate. However, this decrease in the length of the resin's functional group also deceases its capacity to remove PFAS compounds.

In summary, the longer the length functional group of the anion exchange resin the more effective the resin is at removing both long and short-chain PFAS. However, it is very difficult to remove long-chain PFAS from resins with increased length functional groups during regeneration. The shorter the length functional group of the anion exchange resin the easier it is to regenerate.

Thus, system 50 overcomes the problem discussed in the Background section and provides a solution for effectively and efficiently removing both short and long-chain PFAS compounds from contaminated water by utilizing first regenerable anion exchange resin 52 with a reduced length functional group to remove a majority of the long-chain PFAS compounds followed by second regenerable anion exchange resin 62 with an increased length functional group to remove a majority of the short-chain PFAS compounds.

Figure 4:
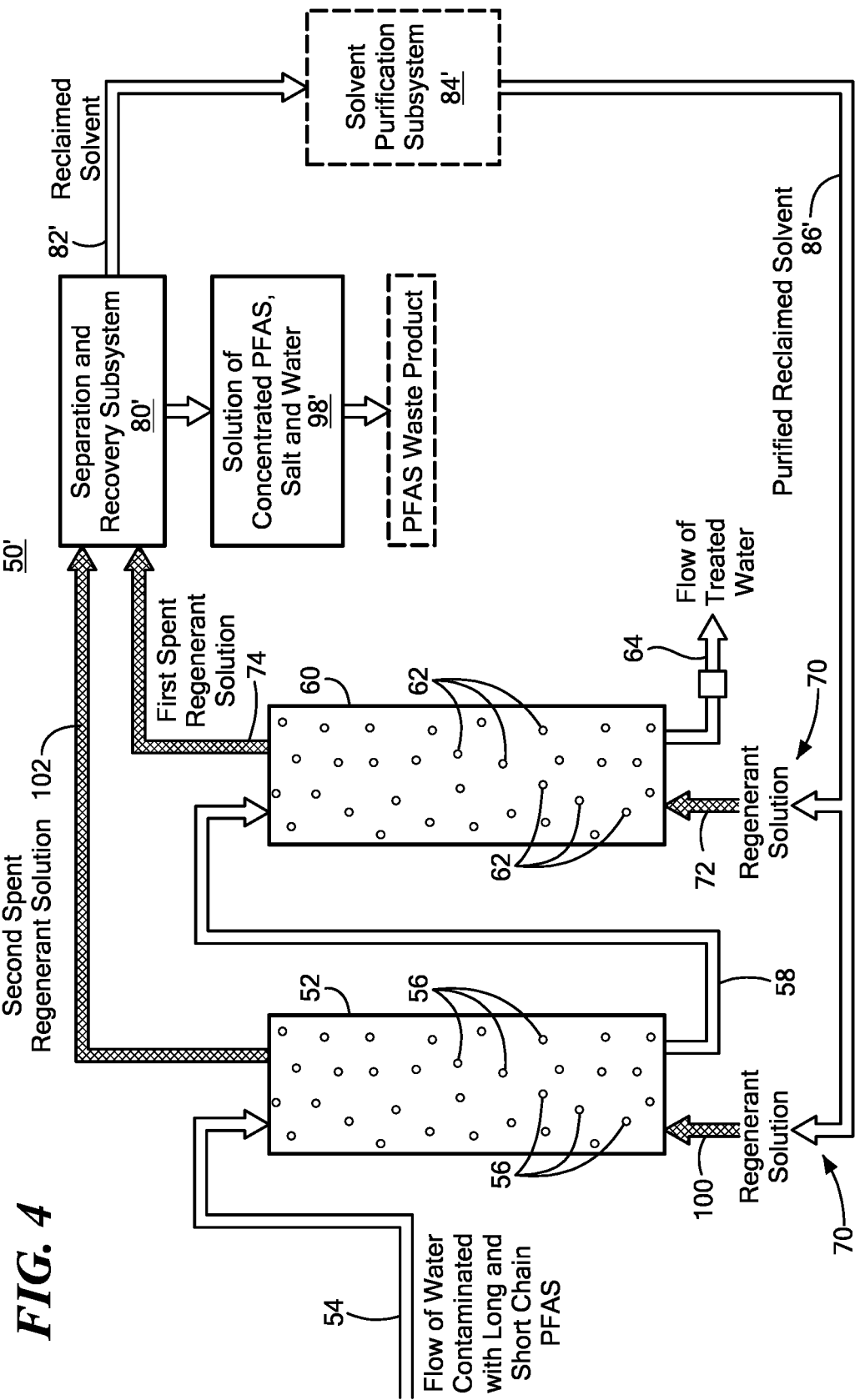
FIG. 4 is a schematic block diagram showing the primary components of another example of system for removing long-chain and short-chain PFAS from contaminated water.

Thus, to effectively remove both short and long-chain PFAS compounds from flow 54 of contaminated water, system 50 initially utilizes first regenerable anion exchange resin 56, FIGS. 3 and 4, preferably having functional groups of reduced length which results in a high affinity for long-chain PFAS compounds and effectively and efficiently removes long-chain PFAS compounds from flow 54 of contaminated water. First regenerable anion exchange resin 56 is preferably highly regenerable for removing long-chain PFAS compounds sorbed to first regenerable anion exchange resin 56 using a regenerant solution, as discussed in detail below. The reduced length of the functional group of first regenerable anion exchange resin 56 may not effectively remove short-chain PFAS compounds.

Then, system 50 utilizes second regenerable anion exchange resin 62 having functional groups with increased length which results in an increased affinity of short-chain PFAS compounds to second regenerable anion exchange resin 62 to effectively and efficiently remove the short-chain PFAS compounds in flow 58. Second regenerable anion exchange resin 62 is preferably highly regenerable for removing short-chain PFAS compounds sorbed onto second regenerable anion exchange resin 62 using a regenerant solution as discussed below.

In one example, first regenerable anion exchange resin 56 and second regenerable anion exchange resin 56 each preferably includes a macroporous, strong base anion exchange resin. In one example, first regenerable anion exchange resin 56 may include SORBIX™ RePURE, an anion exchange resin, available from Montrose Environmental Group, Little Rock, AR 72118 or similar type regenerable anion exchange resins. In one example, second regenerable anion exchange resin 62 may include SIR-110-MP, available from Resin-Tech, Camden, NJ 08105.

The result is system 50 may utilize first regenerable anion exchange resin 56 in first anion exchange resin vessel 52 to remove a majority of the long-chain PFAS compounds and then use second regenerable anion exchange resin 62 that is specifically designed with functional groups that increase the affinity for short-chain PFAS compounds to effectively and efficiently remove the short-chain PFAS compounds.

Both first regenerable anion exchange resin 56 and second regenerable anion exchange resin 62 are preferably highly regenerable, as discussed below. Such a design uses regenerable anion exchange resins to efficiently and cost effectively remove both short and long-chain PFAS compounds from contaminated water.

System 50, FIG. 3, preferably includes resin regeneration subsystem 70 configured to introduce flow 72 of a regenerant solution into at least one second regenerable anion exchange resin vessel 60 to regenerate second regenerable anion exchange resin 62 and produce flow 74 of first spent regenerant solution. Resin regenerant subsystem 70 may also include introducing flow 74 of first spent regenerant solution into at least one first regenerable anion exchange vessel 52 to regenerate first regenerable anion exchange resin 56 and produce flow 76 of second spent regenerant solution.

In one example, first spent regenerant solution 74 and/or second spent regenerant solution 76 preferably includes the solvent, water and salt. In one example, the solvent may include an alcohol.

Resin regenerant subsystem 70 may also include separation and recovery subsystem 80 including at least one of an evaporation subsystem, a distillation subsystem and a membrane separation subsystem, e.g., as disclosed in U.S. Pat. Nos. 10,287,185 and 11,174,175, owned by the assignee hereof, both incorporated by reference herein. Separation and recovery subsystem 80 preferably produces flow 82 of reclaim solvent. Resin regenerant subsystem 70 also preferably includes solvent purification subsystem 84 which receives flow 82 of reclaim solvent and preferably removes any carryover PFAS which may be present in flow 82 to provide flow 86 of purified reclaim solvent 86 for reuse. In one design, flow 86 may be input to flow 72 of regenerant solution as shown. In one example, solvent purification subsystem 84 may include additional anion exchange resin, exemplarily indicated at 88, e.g., SORBEX REPURE, discussed supra, or similar type anion exchange resin, housed in vessel 90 as shown in caption 92.

In one design, separation and recovery subsystem 80 may also produce solution 98 comprising concentrated PFAS, salt and water. Separation and recovery subsystem 80 may include a super-loading recovery subsystem which receives solution 98 of concentrated PFAS, salt and water and separates and further concentrates the PFAS from the solution by sorbing the concentrated PFAS onto a sorbtive media to produce a concentrated PFAS waste product e.g., as disclosed in commonly owned U.S. Pat. Nos. 10,287,185 and 11,174,175, cited supra. The super loading subsystem may also generate a solution comprised of concentrated salt and water.

In another example, system 50', FIG. 4, preferably includes resin regenerant subsystem 70 which similarly introduces flow 72 of regenerant solution into at least one second anion exchange vessel 60 having second anion exchange resin 62 therein. However, in this example, system 50' preferably independently introduces flow 100 of regenerant solution into at least one first regenerable anion exchange resin vessel 52 to regenerate first regenerable anion exchange resin 56 and produce flow 102 of second spent regenerant solution which is preferably introduced to separation and recovery subsystem 80' which operates similar as discussed above with reference to FIG. 3. In this example, separation and recovery subsystem 80' also receives flow 74 of first spent regenerant solution from second anion exchange vessel 60. Separation and recovery subsystem 80' preferably produces flow 82' of reclaimed solvent similar as discussed above and may include solvent purification subsystem 84' similar as discussed above which preferably provides flow 86' of purified reclaimed solvent which may be input to flow 72 of regenerant solution input to second anion exchange resin vessel 60 and preferably also the input to flow 100 of regenerant solution input into first anion exchange resin vessel 52 as shown. In this example, separation and recovery subsystem 80' may also produce solution 98' comprising concentrated PFAS, salt and water. Separation and recovery subsystem 80' may include a super-loading recovery subsystem which receives solution 98' of concentrated PFAS, salt and water and separates and further concentrates the PFAS from the solution by sorbing the concentrated PFAS onto a sorbtive media to produce a concentrated PFAS waste product similar as discussed above with reference to FIG. 3. The super loading subsystem may also generate a solution comprised of concentrated salt and water.

Figure 5:
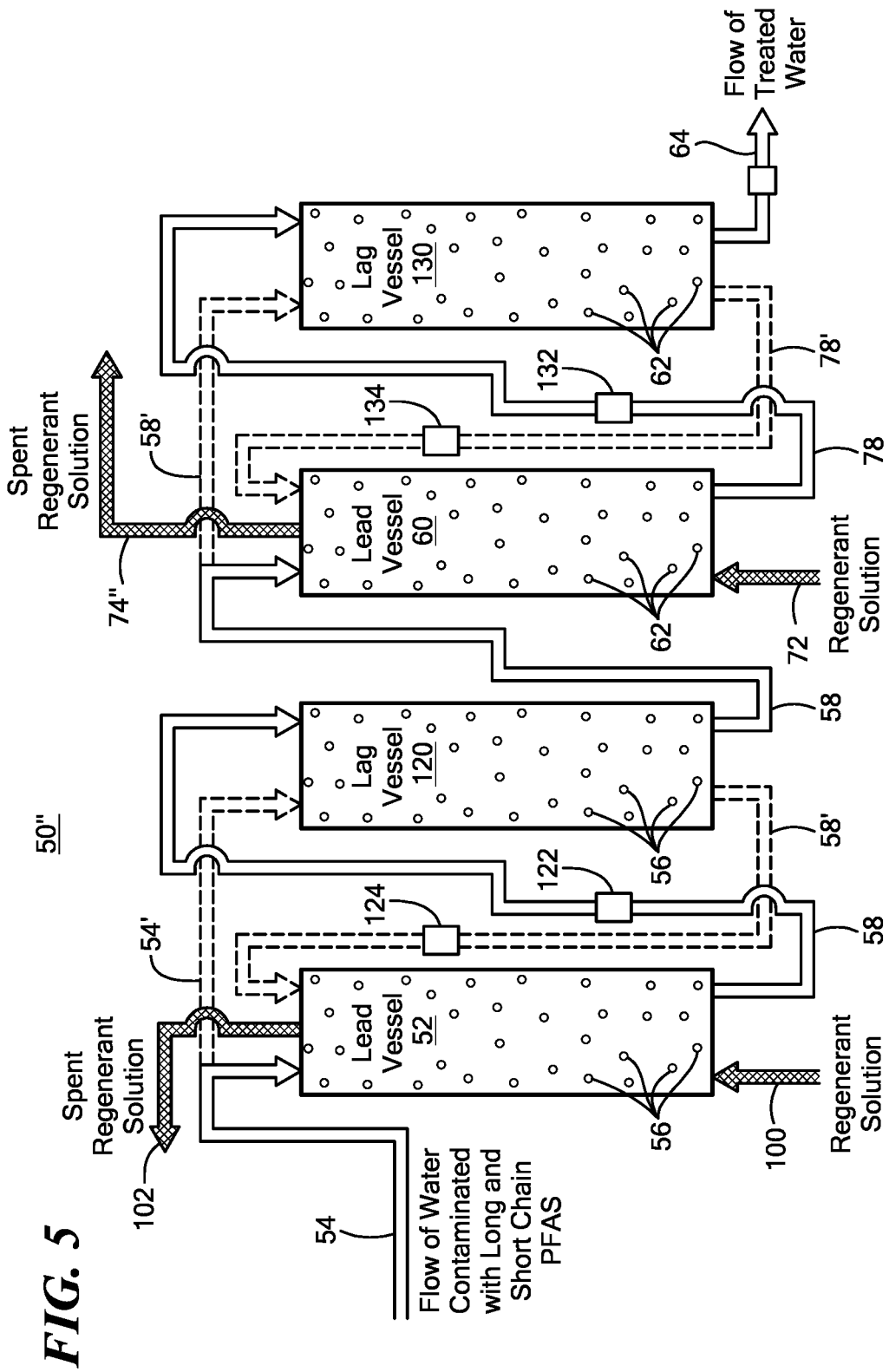
FIG. 5 is a schematic block diagram showing one example of lead and lag vessels which may be utilized with the system shown in FIGS. 3 and 4.

In one design, system 50" FIG. 5 may include anion exchange vessel 52 with first regenerable anion exchange resin 56 therein configured as a lead vessel which receives flow 54 of water contaminated with short and long-chain PFAS compounds. Similar as discussed above, first regenerable anion exchange resin 56 removes a majority of long-chain PFAS compounds from flow 54. System 50" also preferably includes anion exchange vessel 120 with first regenerable anion exchange resin 56 therein configured as lag vessel 120 as shown. Lag vessel 120 with first regenerable anion exchange resin 56 preferably captures any long-chain PFAS compounds that may break through lead vessel 52 in flow 58. System 50" also preferably includes sample tap 122 which is used to detect a predetermined breakthrough concentration of long-chain PFAS compounds in flow 58. When this happens, lead vessel 52 is temporarily taken offline for regeneration of first regenerable anion exchange resin 56 and flow 54 of water contaminated with long-chain PFAS compounds and short-chain PFAS compounds is directed to lag vessel 120 as flow 54' as shown and lag vessel 120 becomes the new lead vessel and outputs flow 58 having a majority of the long-chain PFAS compounds removed. First regenerable anion exchange resin 56 is preferably regenerated using flow 100 of regenerant solution similar as discussed above. Spent regenerant solution 102 is preferably directed to separation and recovery as discussed above. Once first regenerable anion exchange resin 56 in anion exchange vessel 52 is successfully regenerated, anion exchange vessel 52 functions as the new lag vessel and receives flow 58' having a majority of long-chain PFAS compounds removed and captures any long-chain PFAS compounds that may breakthrough lead vessel 120. System 50" also preferably includes sample tap 124 which preferably detects a predetermined breakthrough concentration of long-chain PFAS compounds in flow 58', as discussed above. Additional details of switching between lead and lag vessels is also disclosed in commonly owned U.S. Pat. No. 10,695,709, incorporated by reference herein.

Similarly, system 50" also preferably includes anion exchange vessel 60 with second regenerable anion exchange resin 62 therein configured as a lead vessel which receives flow 58 having a majority of the long-chain PFAS compounds removed and outputs flow 78 of treated water as discussed above. System 50" also preferably includes anion exchange vessel 130 with second regenerable anion exchange resin 62 therein configured as lag vessel 130 as shown. Lag vessel 130 with second regenerable anion exchange resin 62 therein preferably captures any short-chain PFAS compounds in flow 78 that may break though lead vessel 60. System 50" also preferably includes sample tap 132 which is preferably used to detect a predetermined breakthrough concentration of short-chain PFAS compounds in flow 78. When this happens, anion exchange vessel 60 is temporarily taken offline so that second regenerable resin 62 can be regenerated. Second regenerable anion exchange resin 62 is preferably regenerated using flow 72 of regenerant solution similar as discussed above. Flow 58 is directed to lag vessel 130 as flow 58' and lag vessel 130 now becomes the new lead vessel and outputs flow 64 of treated water.

Once second regenerable anion exchange resin 62 in lag vessel 60 is successfully regenerated, anion exchange vessel 60 preferably functions as the lag vessel and receives flow 76' having a majority of the short-chain PFAS compound removed. System 50" also preferably includes tap 134 which preferably detects any breakthrough of short-chain PFAS compounds in flow 78' output by lead vessel 130.

Figure 6:
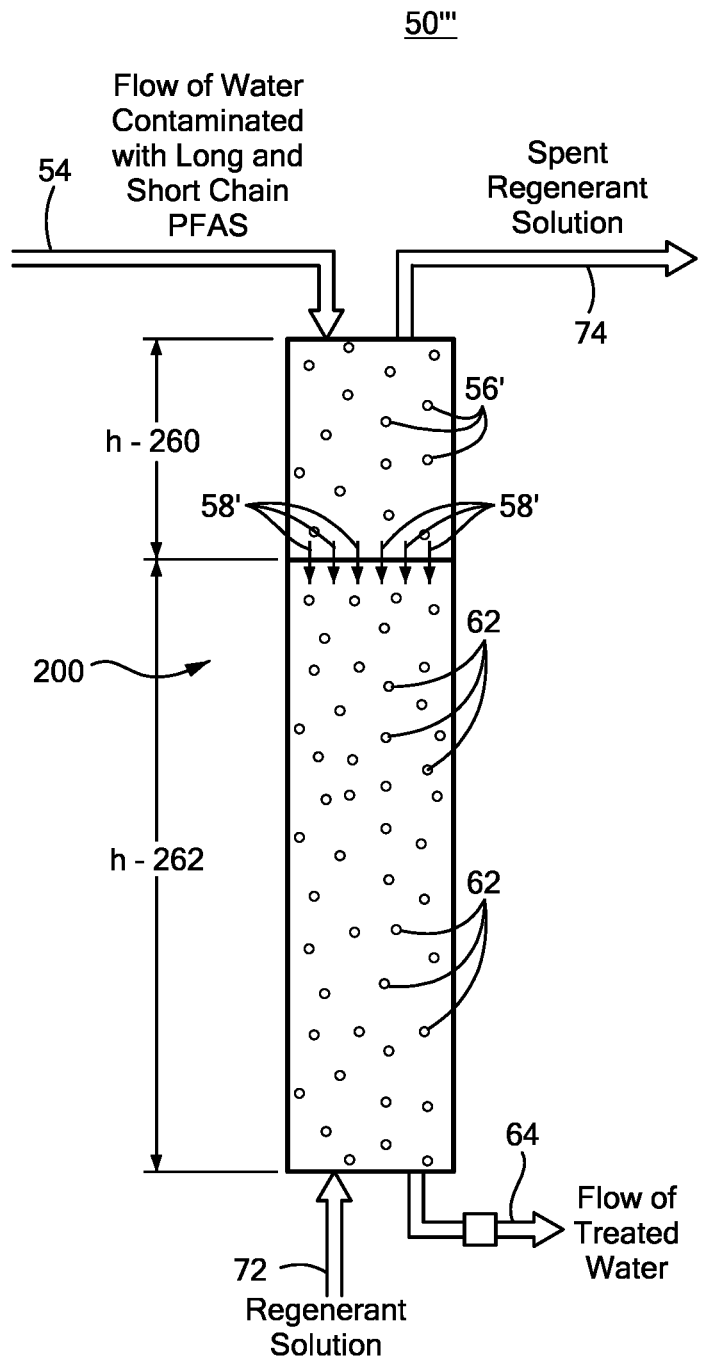
FIG. 6 is a schematic block diagram showing the primary components of another example of system for removing long-chain and short-chain PFAS from contaminated water.

Although as discussed above with reference to one or more of FIGS. 1-5, system 50, 50', 50" preferably includes first regenerable anion exchange resin 56 housed in one or more anion exchange vessels and second regenerable anion exchange resin 62 housed in one more separate anion exchange vessels, in another design, system 50''', FIG. 6, preferably includes first regenerable anion exchange resin 56 housed in anion exchange vessel 200 and second regenerable anion exchange resin 62 also housed in anion exchange vessel 200. In this design, anion exchange vessel 200 receives flow 54 of water contaminated with long and short-chain PFAS compounds. Similar as discussed above, first regenerable anion exchange resin 56 removes a majority of the long-chain PFAS compounds in flow 54 and outputs flow 58' having a majority of the long-chain PFAS compounds removed. Second regenerable anion exchange resin 62 receives flow 58' and removes a majority of the short-chain PFAS compounds and outputs flow 64 of treated water having a majority of the short and long-chain PFAS compounds removed.

Preferably, the height, h-260, of first regenerable anion exchange resin 56 in anion exchange vessel 200 is of sufficient height to accommodate a sufficient amount of first regenerable anion exchange resin 56 to efficiently and effectively remove long-chain PFAS compounds in flow 54. Similar, height, h-262, of second regenerable anion exchange resin 62 in anion exchange vessel 200 is preferably of sufficient height to accommodate a sufficient amount of second regenerable anion exchange resin 62 remove short-chain PFAS compounds from flow 58'. In this example, height h-262 is typically greater than height h-260 because short-chain PFAS compounds are more difficult to remove from contaminated water than long-chain PFAS compounds because the short-chain PFAS compounds have less surface area for sorption to the anion exchange resin. In one example, h-260 is about 4 feet and h-262 is about 8 feet. In another example, h-260 is about 3 feet and h-262 is about 6 feet. H-260 and h-262 may be longer or shorter than as discussed above, as known by those skilled in the art.

System 50" also preferably outputs flow 74" of spent regenerant solution similar as discussed above which is preferably processed by separation and recovery as discussed above.

Figure 7:
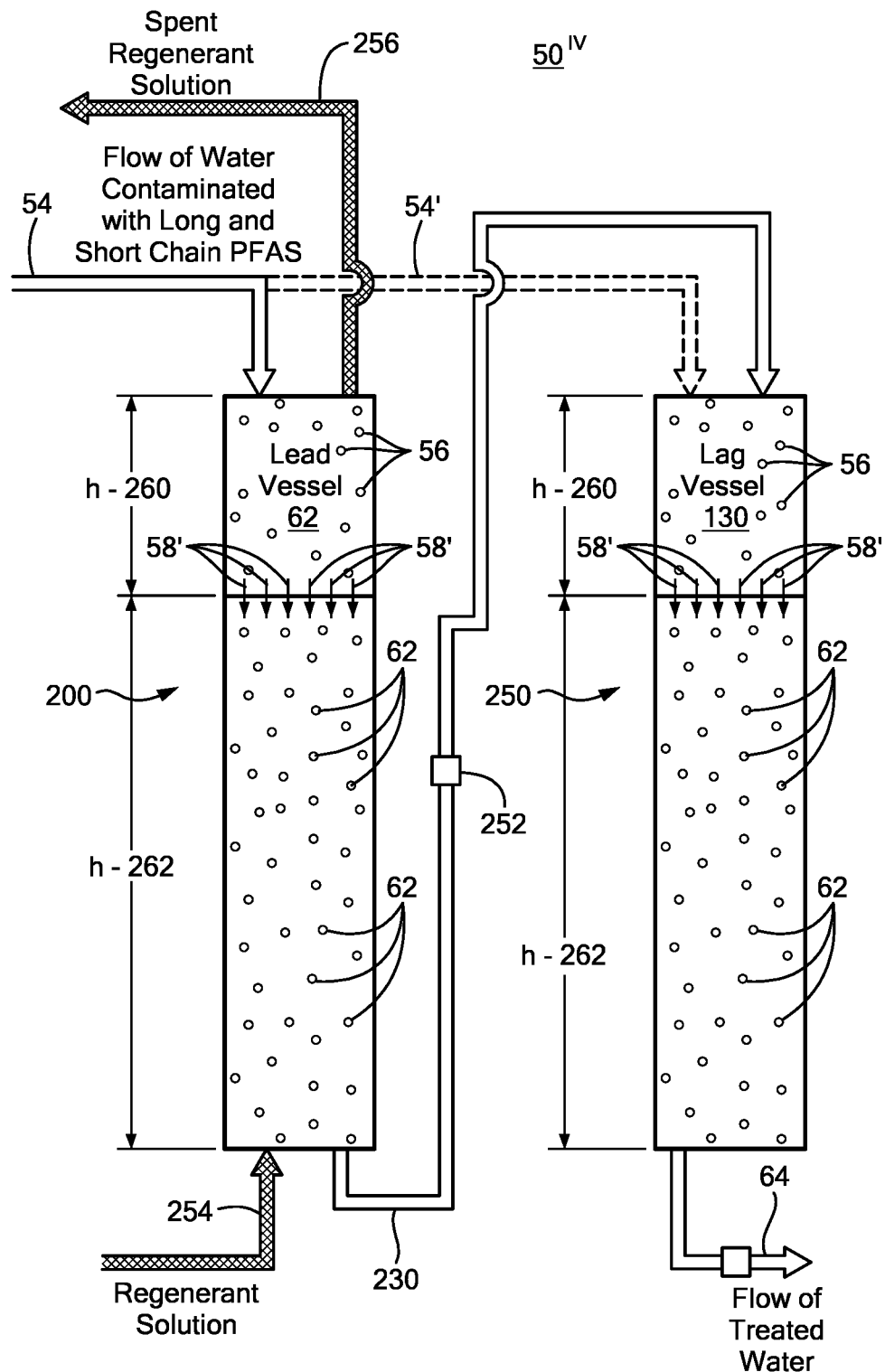
FIG. 7 is a schematic block diagram showing one example of one or more lead and lag vessels which may be utilized with the system shown in FIG. 6.

System 50$^{IV}$, FIG. 7, may include anion exchange vessel 200 having first regenerable anion exchange resin 56 and second regenerable anion exchange resin 62 therein configured as a lead vessel as shown. Similar as discussed above, anion exchange vessel 200 receives flow 54 of water contaminated with long-chain PFAS compounds and short-chain PFAS compounds. First regenerable anion exchange resin 56 removes a majority of the long-chain PFAS compounds in flow 54 and outputs flow 58' having a majority of the long-chain PFAS compounds removed. Second regenerable anion exchange resin 62 receives flow 58' and removes a majority of the short-chain PFAS compounds and produces flow 230 of treated water having a majority of long-chain PFAS compounds and short-chain PFAS compounds removed.

System $50^{IV}$ also preferably includes anion exchange vessel 250 having first regenerable anion exchange resin 56 and second regenerable anion exchange resin 62 therein configured as a lag vessel as shown. Anion exchange vessel 250 preferably captures any long-chain PFAS compounds and/or short-chain PFAS compounds in flow 230 that may break though lead vessel 200. System $50^{IV}$ also preferably includes sample tap 252 which is preferably used to detect a predetermined breakthrough concentration of short-chain PFAS compounds in flow 230. When this happens, anion exchange vessel 200 is temporarily taken offline so that first regenerable anion exchange resin 56 and second regenerable resin 62 in anion exchange vessel 200 can be regenerated, as discussed below. Flow 54 of contaminated water is directed to lag vessel 250 as flow 54' and lag vessel 250 now becomes the new lead vessel and outputs flow 64 of treated water. First regenerable anion exchange resin 56 and second regenerable anion exchange resin 62 in offline anion exchange vessel 200 is preferably regenerated using flow 254 of regenerant solution. Spent regenerant solution 256 is preferably directed to separation and recovery, as discussed above with reference to one or more of FIGS. 3-6. Additional details of switching between lead and lag vessels is also disclosed in commonly owned U.S. Pat. No. 10,695,709, discussed supra.

As discussed above with reference to FIG. 6, the height, h-260, of first regenerable anion exchange resin 56 in anion exchange vessel 200 is preferably of sufficient height to provide a sufficient amount of first regenerable anion exchange resin 56 to efficiently and effectively remove long-chain PFAS compounds from flow 54. The height, h-262, of second regenerable anion exchange resin 62 in anion exchange vessel 200 is preferably of sufficient height to provide a sufficient amount of second regenerable anion exchange resin 62 to efficiently and effectively remove short-chain PFAS compounds from flow 58'. In this example, height h-262 is typically greater than height h-260 because short-chain PFAS compounds are more difficult to remove from contaminated water than long-chain PFAS compounds because the short-chain PFAS compounds have less surface area for sorption.

Figure 8:
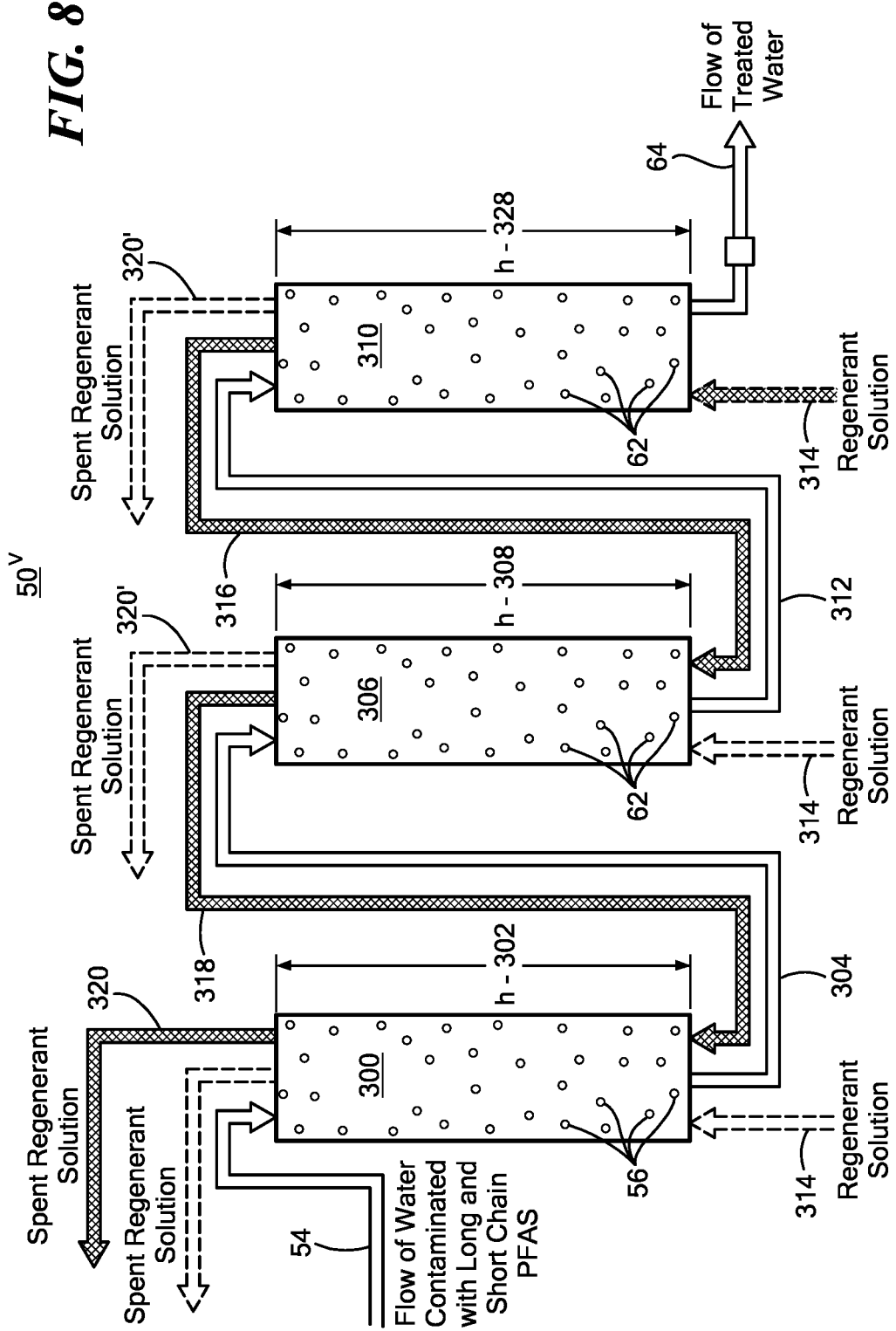
FIG. 8 is a schematic block diagram showing one example of one or more anion exchange vessels configured in series to reduce the height of the anion exchange vessel shown in FIG. 6.

In another design, system $50^V$, FIG. 8, preferably includes anion exchange vessel 300 having first regenerable anion exchange resin 56 therein at a height, h-302, preferably of sufficient height to provide a sufficient amount of first regenerable anion exchange resin 56 to effectively and efficiently remove long-chain PFAS compounds from flow 54 of contaminated water and output flow 304 having a majority of the long-chain PFAS compounds removed. In order to reduce height h-262, FIG. 6 of anion exchange vessel 200 and/or anion exchange vessel 250, FIG. 7, system $50^V$, FIG. 8, preferably includes anion exchange vessel 306 having second regenerable anion exchange resin 62 therein connected in series to anion exchange vessel 300 to receive flow 304. The height, h-308, of second regenerable anion exchange resin 62 in anion exchange vessel 306 preferably provides a sufficient amount of second regenerable anion exchange resin 62 to remove a substantial portion of short-chain PFAS compounds in flow 304 and output flow 312 having a substantial portion of long-chain PFAS compounds removed.

System $50^V$ also preferably includes anion exchange vessel 310 having second regenerable anion exchange resin 62 therein coupled in series with anion exchange vessel 306 and receives flow 312 having the long-chain PFAS compounds removed and a substantial portion of the short-chain PFAS compounds removed. Anion exchange vessel 310 preferably has a height, h-328, which is of sufficient height to provide a sufficient amount of second regenerable anion exchange resin 62 to remove a majority of carryover short-chain PFAS compounds in flow 316 and produce flow 64 of treated water having a majority of long-chain PFAS compounds and short-chain PFAS compounds removed. In one example, h-302, h-308, and h-328 are each about 12 feet. H-302, h-308, and h-328 may be longer or shorter than as discussed above, as known by those skilled in the art.

Thus, system $50^V$ utilizes three anion exchange vessels in series as shown which each preferably have a have a height equal to the height of anion exchange vessel 200 shown in FIG. 6. This provides the ability to utilize more anion exchange resin within a given height constraint to substantially increase overall system capacity to remove a majority of long and short chain PFAS from contaminated water.

In one example, second regenerable anion exchange resin 62 in anion exchange vessel 310 may be regenerated by temporarily taking system $50^V$ offline and introducing flow 314 of regenerant solution into anion exchange vessel 310. Flow 316 of spent regenerant solution is preferably directed to anion exchange vessel 306 to regenerate second regenerable anion exchange resin 62 in anion exchange vessel 306. Flow 316 of spent regenerant solution is then preferably directed to anion exchange vessel 300 to regenerate first regenerable anion exchange resin 56. Flow 320 of spent regenerant solution may be directed to separation and recovery, as discussed above with reference to one or more of FIGS. 3-7.

In another example, flow 314 of regenerant solution may be separately introduced to anion exchange vessel 300, anion exchange vessel 306, and/or anion exchange vessel 310 as shown to regenerate first regenerable anion exchange resin 56 and second regenerable anion exchange resin 62. Flow 320' of spent regenerant solution may be directed to separation and recovery, as discussed above with reference to one or more of FIGS. 3-7.

Figure 9:
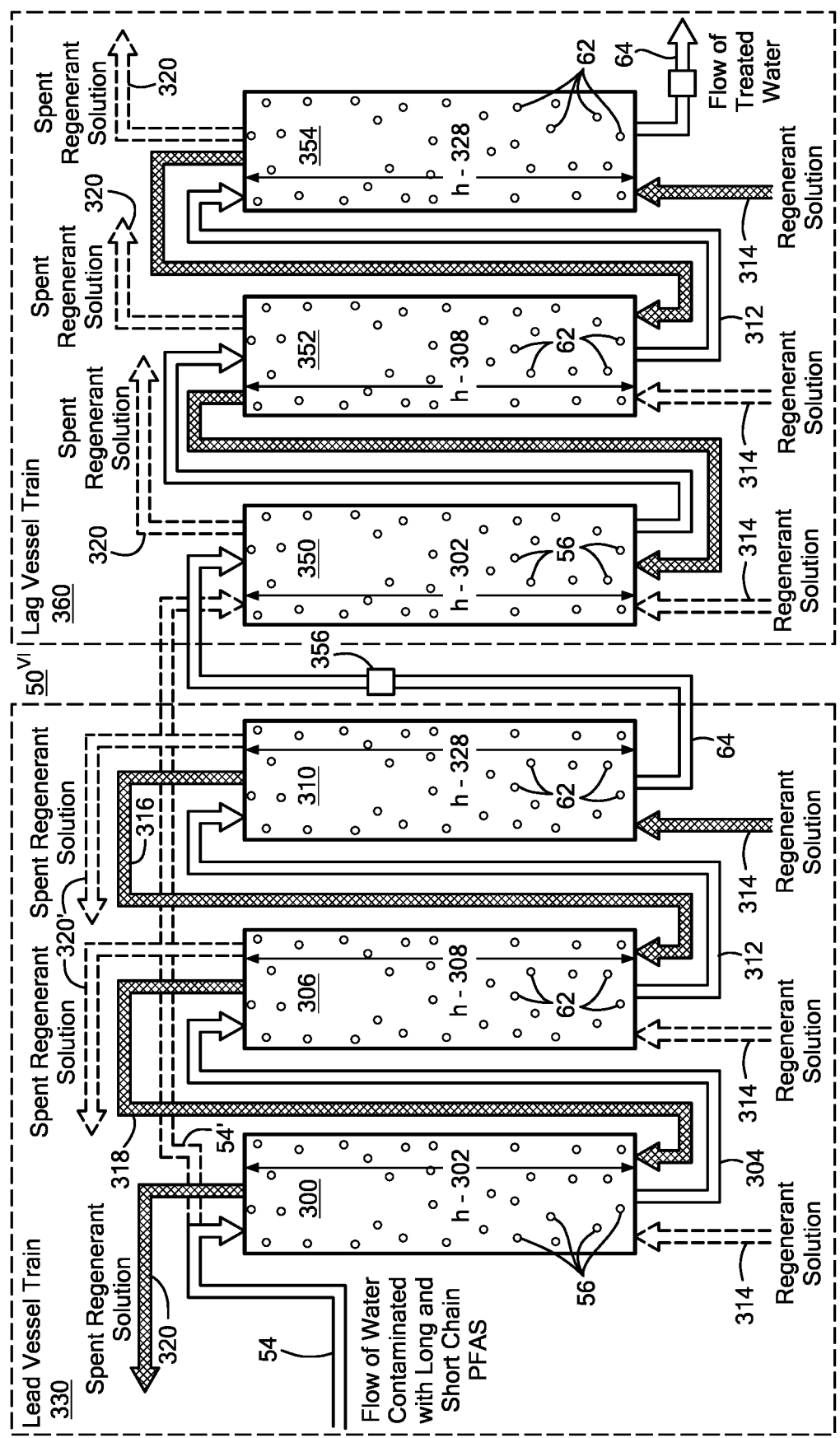
FIG. 9 is a schematic block diagram showing one example of the system shown in FIG. 8 arranged in lead-lag vessel configuration.

System $50^{VI}$, FIG. 9, may include anion exchange vessel 300 having first regenerable anion exchange resin 56 coupled in series with anion exchange vessel 306 having second regenerable anion exchange resin 62 therein coupled in series with anion exchange vessel 310 having second regenerable anion exchange resin 62 therein configured as lead vessel train 330 as shown. Similar as discussed above with reference to FIG. 8, anion exchange vessels 300, 306, and 310 remove a majority of the long-chain PFAS compounds and short-chain PFAS compounds from flow 54 of contaminated water and output flow 64 of treated water having a majority of the long-chain PFAS compounds and short-chain PFAS compounds removed.

System $50^{VI}$, FIG. 9, also preferably includes lag vessel train 360 including anion exchange vessel 350 having first regenerable anion exchange resin 56 coupled in series with anion exchange vessel 352 having second regenerable anion exchange resin 62 therein coupled in series with anion exchange vessel 354 having second regenerable anion exchange resin 62 therein configured as lag vessel train 360 as shown.

Anion exchange vessel 350 preferably has a height, h-302, similar to anion exchange vessel 300, anion exchange vessel 352 preferably has a height, h-308, similar to anion exchange vessel 306, and anion exchange vessel 354 preferably has a height, h-328, similar to anion exchange vessel 310. Anion exchange vessels 350, 352, and 354 preferably operate similar to anion exchange vessel 300, 306, and 310, respectively, as discussed above.

Anion exchange vessel 350 of lag vessel train 360 preferably captures any long-chain PFAS compounds and/or short-chain PFAS compounds in flow 64 that may break though lead vessel train 330. System $50^{IV}$ also preferably includes sample tap 356 which is preferably used to detect a predetermined breakthrough concentration of long-chain and/or short-chain PFAS compounds in flow 64. When this happens, lead vessel train 330 is temporarily taken offline so that first regenerable anion exchange resin 56 in anion exchange vessel 300 and second regenerable resin 62 in anion exchange vessels 306 and 310 can be regenerated, as discussed below. Flow 54 of contaminated water is directed to anion exchange vessel 350 as flow 54' and lag vessel train 360 now becomes the new lead vessel train and outputs flow 64 of treated water.

In one example, second regenerable anion exchange resin 62 in offline anion exchange vessel 310 may be regenerated by introducing flow 314 of regenerant solution into anion exchange vessel 310. Flow 316 of spent regenerant solution is preferably directed to anion exchange vessel 306 to regenerate second regenerable anion exchange resin 62 in anion exchange vessel 306. Flow 318 of spent regenerant solution is then the preferably directed to anion exchange vessel 300 to regenerate first regenerable anion exchange resin 56. Flow 320 of spent regenerant solution may be directed to separation and recovery, as discussed above with reference to one or more of FIGS. 3-7.

In another example, flow 314 of regenerant solution may be separately introduced to anion exchange vessel 300, anion exchange vessel 306, and/or anion exchange vessel 310 as shown to regenerate first regenerable anion exchange resin 56 and second regenerable anion exchange resin 62. Flow 320' of spent regenerant solution may be directed to separation and recovery, as discussed above with reference to one or more of FIGS. 2-8. Additional details of switching between lead and lag vessel is also disclosed in U.S. Pat. No. 10,695,709, discussed supra.

System 50. FIGS. 4-9, may include a sample tap as shown which may be used to detect a predetermined breakthrough concentration of long-chain PFAS compounds and/or short-chain PFAS compounds in flow 64.

Figure 10:
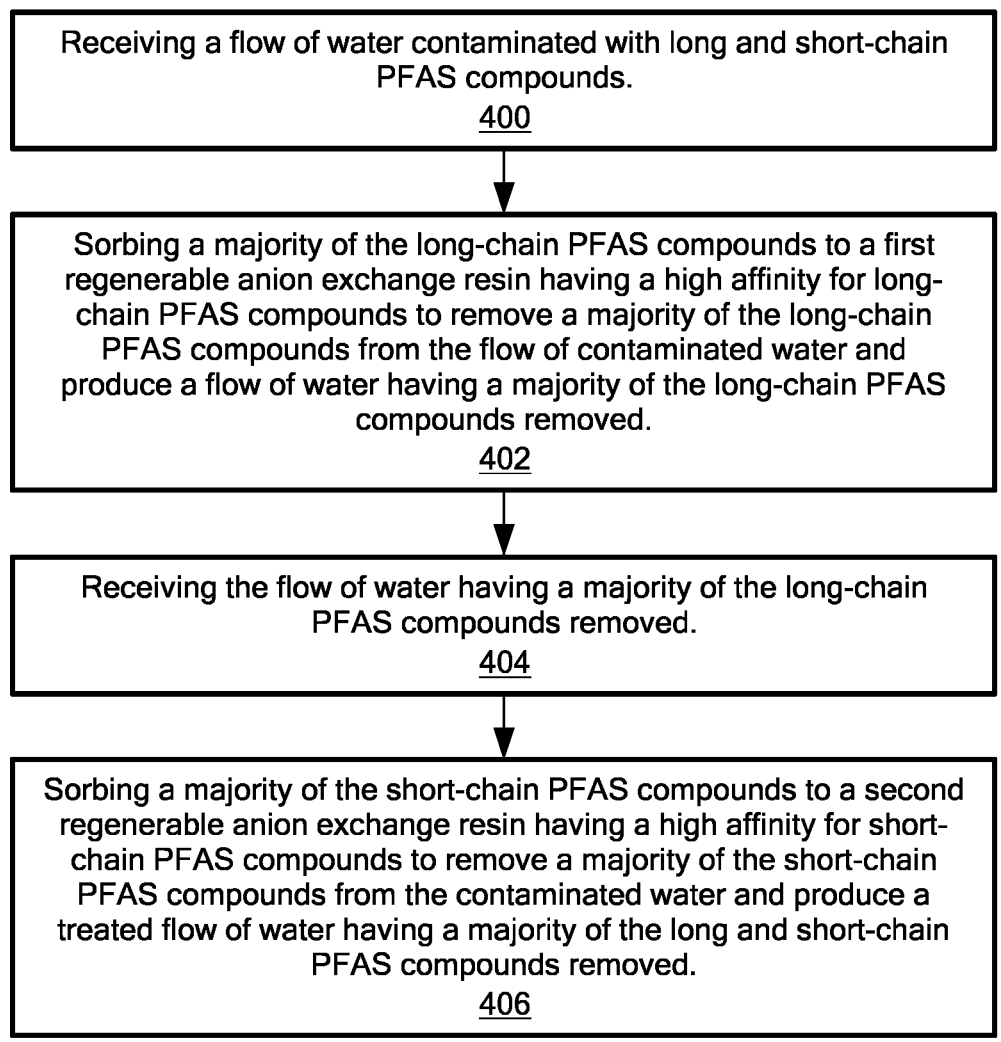
FIG. 10 is a flow chart showing the primary steps of one example of method for removing long-chain and short-chain PFAS from contaminated water.

One example of the method for removing long and short-chain PFAS compounds from contaminated resin may include receiving a flow of water contaminated with long and short-chain PEAS compounds, step 400, FIG. 10. The method also includes sorbing a majority of the long-chain PFAS compounds to a first regenerable anion exchange resin having a higher affinity for long-chain PFAS compounds to e a majority of the long-chain PEAS compounds from the flow of contaminated water and produce a flow of water having a majority of the long-chain PFAS compounds removed, step 402. The method also includes receiving the flow of water having the majority of the PFAS compounds removed, step 404 and sorbing a majority of the short-chain PFAS compounds to a second regenerable anion exchange resin having a high affinity for short chain PFAS to remove a majority of the short-chain PFAS compounds fix the contaminated water and produce a treated flow of water having a majority of the long and short-chain PFAS compounds removed, step 406.

Although specific features of the invention are shown in some drawings and not in others, this is for convenience only, as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A system for removing long-chain and short-chain per- and polyfluoroalkyl substances (PFAS) from contaminated water using at least two different regenerable anion exchange resins, the system comprising:
    at least one first anion exchange resin vessel configured to receive a flow of water contaminated with long and short-chain PFAS compounds, the at least one first anion exchange resin vessel including a first regenerable anion exchange resin therein having a high affinity for long-chain PFAS compounds configured such that a majority of the long-chain PFAS compounds sorb to the first regenerable anion exchange resin to remove the majority of the long-chain PFAS compounds from the flow of the contaminated water and produce a flow of water having a majority of the long-chain PFAS compounds removed;
    at least one second anion exchange resin vessel, the second anion exchange resin vessel configured to receive the flow of water having the majority of the long-chain PFAS compounds removed, the at least one second anion exchange resin vessel including a second regenerable anion exchange resin therein having a high affinity for short-chain PFAS compounds and configured such that a majority of the short-chain PFAS compounds sorb to the second anion exchange resin to remove the majority of the short-chain PFAS compounds from the contaminated water and produce a treated flow of water having a majority of the long and short-chain PFAS compounds removed, and
    wherein the second regenerable anion exchange resin includes a macroporous resin including functional groups configured to increase the affinity of the short-chain PFAS compounds to the second regenerable anion exchange resin and increase a capacity of the second regenerable anion exchange resin to remove the short-chain PFAS compounds from the flow of water having the majority of the long-chain PFAS compounds removed; and wherein selecting to increase length and basicity of the functional groups increases the affinity of the short-chain PFAS compounds to the second regenerable anion exchange resin.

2. The system of claim 1 including a resin regeneration subsystem configured to introduce a flow of a solution into the at least one second regenerable anion exchange resin vessel to regenerate the second regenerable anion exchange resin and produce a flow of a first spent regenerant solution.

3. The system of claim 2 in which the resin regeneration subsystem includes introducing the flow of the first spent regenerant solution or another flow of regenerant solution into the at least one first anion exchange resin vessel to regenerate the first regenerable anion exchange resin and produce a flow of a second spent regenerant solution.

4. The system of claim 1 in which the first regenerable anion exchange resin and the second regenerable anion exchange resin include a macroporous, strong base, anion exchange resin.

5. The system of claim 1 in which the at least one first anion exchange resin vessel includes at least one lead vessel and at least one lag vessel.

6. The system of claim 1 in which the at least one second anion exchange resin vessel includes at least one lead vessel and at least one lag vessel.

7. A system for removing long-chain and short-chain per- and polyfluoroalkyl substances (PFAS) from contaminated water using at least two different regenerable anion exchange resins, the system comprising:
at least one anion exchange resin vessel configured to receive a flow of water contaminated with long and short-chain PFAS compounds, the at least one anion exchange resin vessel including a first regenerable anion exchange resin therein having a high affinity for long-chain PFAS compounds configured such that a majority of the long-chain PFAS compounds sorb to the first regenerable anion exchange resin to remove the majority of the long-chain PFAS compounds from the contaminated water and produce a flow of water having a majority of the long-chain PFAS compounds removed;
the at least one anion exchange resin vessel further including a second regenerable anion exchange resin therein, the second regenerable resin configured to receive the flow of water having the majority of the long-chain PFAS compounds removed, the second regenerable anion exchange resin having a high affinity for short-chain PFAS compounds and configured such that a majority of the short-chain PFAS compounds sorb to the second regenerable anion exchange resin to remove the majority of the short-chain PFAS compounds from the contaminated water and produce a treated flow of water having a majority of the long and short-chain PFAS compounds removed;
wherein the second regenerable anion exchange resin includes a macroporous resin including functional groups configured to increase the affinity of the short-chain PFAS compounds to the second regenerable anion exchange resin and increase a capacity of the second regenerable anion exchange resin to remove the short-chain PFAS compounds from the flow of water having the majority of the long-chain PFAS compounds removed; and
wherein selecting to increase length and basicity of the functional groups increases the affinity of the short-chain PFAS compounds to the second regenerable anion exchange resin.

8. The system of claim 7 in which the at least one anion exchange resin vessel includes at least one lead vessel train and at least one lag vessel train.

9. The system of claim 7 including a resin regeneration subsystem configured to introduce a flow of a regenerant solution into the second regenerable anion exchange resin to regenerate the second regenerable anion exchange resin and produce a flow of a first spent regenerant solution.

10. The system of claim 9 in which the resin regeneration subsystem includes introducing the flow of the first spent regenerant solution or another flow of regenerant solution into the first regenerable anion exchange resin to regenerate the first regenerable anion exchange resin and produce a flow of a second spent regenerant solution.

11. The system of claim 7 in which the first regenerable anion exchange resin and the second regenerable anion exchange resin include a macroporous, strong base, anion exchange resin.

12. The system of claim 8 in which the at least one lead vessel train includes a plurality of anion exchange resin vessels connected in series such that one of the plurality of anion exchange resin vessel is configured to receive the flow of contaminated water and includes the first regenerable anion exchange resin therein to remove the majority of the long-chain PFAS compounds from the contaminated water and produce the flow of water having the majority of the long-chain PFAS compounds removed and another of the plurality of anion exchange resin vessels is configured to receive the flow of contaminated water having a majority of the long-chain PFAS compounds removed and including the second regenerable anion exchange resin therein to remove the majority of the short-chain PFAS compounds and produce the treated flow of water having the majority of the long and short-chain PFAS compounds removed.

13. The system of claim 8 in which the at least one lag vessel train includes a plurality of anion exchange resin vessels connected in series configured to receive the treated flow of water which may have carryover short-chain PFAS compounds therein and output the treated flow of water having the majority of the long and short-chain PFAS compounds removed.

* * * * *